United States Patent [19]

De Bonneville et al.

[11] Patent Number: 5,034,117

[45] Date of Patent: Jul. 23, 1991

[54] PROCESS FOR REGENERATING A CATALYST FOR THE PRODUCTION OF AROMATIC HYDROCARBONS OR FOR REFORMING

[75] Inventors: Jean De Bonneville, Rueil Malmaison; Pierre Ham, Bougival; Jean-Claude Macaire, Nanterre, all of France

[73] Assignee: Institut Francais du Petrole, Rueil Malmaison, France

[21] Appl. No.: 464,507

[22] Filed: Jan. 12, 1990

[30] Foreign Application Priority Data

| | | | |
|---|---|---|---|
| Jan. 13, 1989 | [FR] | France | 89 00467 |
| Jun. 15, 1989 | [FR] | France | 89 08090 |
| Aug. 25, 1989 | [FR] | France | 89 11320 |

[51] Int. Cl.[5] ........................ B01J 23/96; B01J 38/44; C10G 35/085

[52] U.S. Cl. ...................................... 208/14; 422/216; 422/223; 502/37

[58] Field of Search ..................... 502/37, 35; 208/140

[56] References Cited

U.S. PATENT DOCUMENTS

| | | | |
|---|---|---|---|
| 3,647,680 | 3/1972 | Greenwood et al. | 502/37 |
| 3,935,244 | 1/1976 | Hayes | 208/140 |
| 4,133,743 | 1/1979 | Boret et al. | 502/37 |
| 4,172,027 | 10/1979 | Ham et al. | 208/140 |
| 4,218,338 | 8/1980 | Huin et al. | 502/37 |
| 4,578,370 | 3/1986 | Greenwood | 502/37 |
| 4,849,092 | 7/1989 | Ham et al. | 502/37 |

*Primary Examiner*—Paul E. Konopka
*Attorney, Agent, or Firm*—Millen, White & Zelano

[57] ABSTRACT

The invention concerns a regeneration process and the corresponding apparatus for regeneration of a reforming catalyst, the reforming operation being carried out in at least two reactors in series, through which the catalyst and the charge successively flow, the pressure in the first reactor through which the catalyst and the charge pass being under a pressure of between 3 and 8 bars.

The regeneration process is characterized in that the exhausted catalyst successively meets a first radial moving bed combustion zone 101, a second radial moving bed combustion zone 105, an axial oxychlorination moving bed zone 107 and an axial calcination moving bed zone 116, and that in the combustion zones the catalyst is treated under a pressure substantially equal to that which obtains in said first reactor, the burning gases are discharged from the second burning zone and are passed to a washing loop after having been previously mixed with the gases withdrawn from the oxychlorination zone and the calcination zone, that in the oxychlorination zone the catalyst is treated in co-flow relationship by a mixture of a gas from the calcination zone and a gas based on a chlorinated compound, and that in the calcination zone the catalyst is treated in counter-flow relationship by at least a part of the gases from the washing loop.

7 Claims, 1 Drawing Sheet

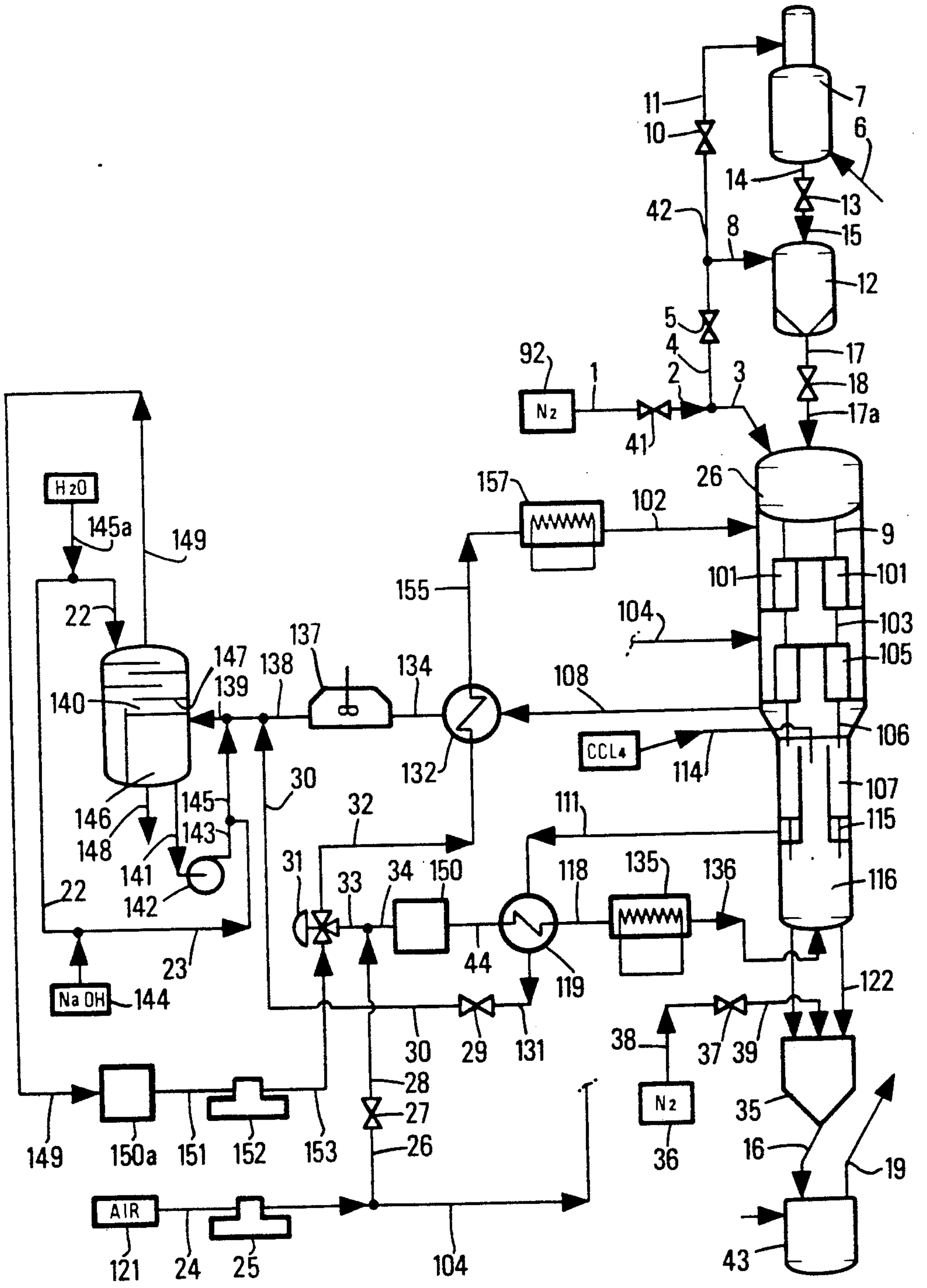
N2
H2O
CCL4
Na OH
AIR
N2
1
2
3
4
5
6
7
8
9
10
11
12
13
14
15
16
17
17a
18
19
22
23
24
25
26
27
28
29
30
31
32
33
34
35
36
37
38
39
41
42
43
44
92
101
102
103
104
105
106
107
108
111
114
115
116
118
119
121
122
131
132
134
135
136
137
138
139
140
141
142
143
144
145
145a
146
147
148
149
150
150a
151
152
153
155
157

PROCESS FOR REGENERATING A CATALYST FOR THE PRODUCTION OF AROMATIC HYDROCARBONS OR FOR REFORMING

The present invention concerns a process for the regeneration of a catalyst comprising a support and at least one metal from the periodic table of elements and a certain percentage of a halogen, for example from 0.1 to 10% by weight.

The present invention therefore concerns the regeneration of a catalyst which is used for the conversion of hydrocarbons and in particular a catalyst for hydroreforming of hydrocarbons or a catalyst for the production of aromatic hydrocarbons, for example the production of benzene, toluene and xylenes (ortho, meta or para), either from saturated or unsaturated essential oils (for example essential oils from cracking pyrolysis, in particular steam cracking or catalytic reforming), or from naphthenic hydrocarbons which are capable by dehydrogenation of being transformed into aromatic hydrocarbons.

When a regeneration operation becomes necessary, the catalyst comes either from a tank in which it was accumulated before a regeneration operation is carried out, or directly from the reactor in which the reaction is carried on; the powder catalyst, for example in the form of grains or extrudates, is then passed into a regeneration chamber. Regeneration which is satisfactory from the applicants' point of view, as described in U.S. Pat. No. 4,218,338 comprises treating the catalyst in a chamber in which the catalyst is treated therein in the form of a fixed or moving bed. In the chamber the catalyst is successively:

(a) subjected to combustion by means of a gas containing molecular oxygen;

(b) subjected to chlorination or oxychlorination simultaneously by means of a gas containing molecular oxygen and by means of a halogen (for example chlorine) or a halogenated compound, for example a halogenated hydracid or an alkyl halide, or a mixture of halogen and a halogenated compound; and (c) subjected to a final treatment by means of a gas containing a high concentration of molecular oxygen (calcination).

In the regeneration operation, the procedure may be carried out in two ways:

either by operating as in the present applicants' U.S. Pat. No. 4,218,338 in a regeneration zone in which the catalyst to be regenerated is disposed in a fixed bed. The catalyst is then regenerated in a fixed bed in three successive steps (a), (b) and (c);

or as in U.S. Pat. No. 3,647,680 by operating in a regeneration zone in which the catalyst to be regenerated circulates in the form of a moving bed. In the course of the downward movement of the catalyst within the regeneration zone, the catalyst passes successively through three separate zones corresponding to each of the three steps (a), (b) and (c) of the regeneration process.

It is an alternative form of that second procedure which the applicants seek to improve herein in the present invention, that alternative form of the procedure being possible only if two of the teachings of U.S. Pat. No. 3,647,680 are not used, namely: on the one hand the gas used in the chlorination or oxychlorination operation must contain a very small and critical amount of water vapour, and on the other hand air is not to be used in the calcination step, but an inert gas containing a relatively low percentage of oxygen, that is to say a gas containing an amount of oxygen which is less than that to be found in air (20%).

The detailed conditions of the process in each regeneration step are described in the present applicants' U.S. Pat. No. 4,218,338 which is incorporated herein by way of reference thereto:

(a) a first step corresponds to combustion of coke deposits; that operation is carried out by the injection of oxygen in an inert mixture, the inert mixture serving as a thermal diluent;

(b) a second step corresponds to chlorination or oxychlorination of the catalyst; in order to carry out an oxychlorination operation, the process involves increasing the amount of oxygen in the regeneration gas introduced into the regenerator by simultaneously introducing a compound based on chlorine, that is to say either chlorine itself, or hydrochloric acid, or halogenated organic acids, or an alkyl (or cycloalkyl) chloride, so as to be capable of forming from 0.5 to 1.2% by weight of a chlorinated derivative of alumina (when alumina is the catalytic support) with respect to the catalyst which is subjected to regeneration; and (c) a final regeneration step corresponds to calcination of the catalyst (calcination): to carry out that operation, the procedure involves using a dry gas containing an amount of oxygen of between 3 and 10% by volume with respect to the regeneration gases introduced into the regenerator.

After the third step, the catalyst is generally purged with nitrogen and then put for example in a hydrogen atmosphere into a condition of pressure equilibrium with the reaction zone in which the catalyst is going to be injected. However, before being introduced into a reactor or at the reactor head the catalyst is in general firstly treated by means of a flow of hydrogen. Sulphurisation of the catalyst, in cases in which it may be necessary to effect such an operation, may be carried out in that space or at the head of the reactor itself or in the various conduits for transferring the catalyst to the head of that reactor.

The different gaseous compounds which are drawn off in the regeneration zone in the course of the steps in the regeneration process are recovered and treated so as to be recycled again into the regeneration zone. In fact, it is not possible to forego re-using those gases. It has been seen that the oxygen was essentially diluted by means of nitrogen. Now, nitrogen is a very burdensome gas. In a reforming or aromizing unit using 40 tonnes of catalyst, regeneration of those 40 tonnes of catalyst, if the regeneration gases were not re-used, would necessitate from 6,000 to 10,000 normal cubic metres per hour of nitrogen ('normal' meaning that the volume of nitrogen is measured at normal pressure and temperature); by recycling the regeneration gases the level of consumption of fresh nitrogen falls to about 80 normal cubic metres per hour.

The various gaseous compounds which are drawn off in the regeneration zone are hot at the time at which they are drawn off and in addition they contain chlorine by virtue of the continuous feed of chlorine or a chlorinated compound into the regenerator. It is therefore essential to use a recycling loop circuit, with appropriate treatment of the gaseous products which are drawn off from the regenerator.

Nowadays, in catalytic reforming processes, the endeavour is to operate at lower and lower pressures, being lower for example than 10 bars and being in particular between 3 and 8 bars or even lower.

That reduction in pressure is in fact accompanied by an increase in levels of yield. The disadvantage of that technology is that coke is more rapidly deposited on the catalyst. Whereas hitherto it was possible to effect regeneration of the catalyst for example only every 15 days (a 15 day cycle for complete circulation of the catalyst through all the reactors and through the regeneration zone), when operating at low pressure it becomes necessary to have cycles of only 7 days and even cycles of the order of from 2 to 3 days. Those short cycles result in various disadvantages: a great deal of catalyst is immobilised outside the reactors, awaiting regeneration; indeed, the levels of regeneration capacity are nowadays often exceeded on sites where it is no longer possible to effect regeneration of the catalyst as it is drawn from the reactors.

It was therefore necessary to propose and use a new regeneration loop which makes it possible to regenerate catalyst without interruption at a rate of about 1 tonne per hour or of the order of 25 tonnes per day. Under such conditions, there is for example only about 5 to 6 tonnes of catalyst undergoing regeneration at a time whereas in the prior art there was about 22 tonnes of catalyst undergoing regeneration at a time. It means that in the present invention the regeneration capacities are much higher and it is possible to effect rotation of the exhausted catalyst to the regeneration operation, without waiting, while succeeding in continuously regenerating amounts of catalyst which are close for example to the order of 1 tonne per hour of a catalyst containing about 5% of coke.

One of the features of the invention is to effect regeneration at the same pressure as that which obtains in the first reactor through which pass the charge of hydrocarbons and the fresh or regenerated catalyst.

By way of example, the above-mentioned pressure will thus preferably be of the order of from 3 to 8 bars, the pressure in the last reactor through which the charge passes and from which the exhausted catalyst is withdrawn being of the order of from 1 to 6 bars, for example 3 bars. It is therefore only necessary to have a lock device in order to raise the pressure of the last reactor to the pressure of the regenerator which in accordance with the invention therefore operates in this case substantially at the pressure of the first reactor, namely 3 to 8 bars, instead of approximately 15 bars in the prior art, and even 40 bars about 20 years ago. The regeneration operation in the strict sense, as in the prior art (for example the present applicants' U.S. Pat. No. 4,172,027) comprises at least one catalyst burning zone, then an oxychlorination zone and finally a calcination zone.

The regeneration loop which will be described hereinafter makes it possible on the one hand advantageously to use the heat produced by the reactor for burning the coke deposited on the catalyst, while using a part of the gas to effect calcination with a dry gas (containing less than 50 ppm of water) and oxychlorination (preferably moist) of the catalyst.

In the present invention, the catalyst at the discharge from the last reactor is generally transported by a lift, for example by means of nitrogen, to the regeneration zone.

The regenerator being at a pressure close to that of the first reactor, it is necessary to envisage the provision of a lock device.

The regenerator is of reforming reactor type in which the catalyst circulates under the effect of gravity. The catalyst is continuously regenerated.

It passes successively through four zones:

a first burning zone at between 350° and 480° C., preferably between 380° and 420° C. (and for example around 400° C.), in the presence of an inert gas containing 0.01 to 1%, preferably from 0.5 to 0.8% by volume of oxygen (for example 0.6%);

a second burning zone at between 370° and 480° C., preferably between 450° and 490° C. (for example around 470° C.), in the presence of an inert gas containing from 0.01 to 1%, preferably from 0.2 to 0.4% of oxygen by volume (for example 0.2%);

Those two zones comprise a radial moving bed, a bed with a low pressure drop which is dimensioned in accordance with the standards of existing reactors (a perforated metal plate in particular can provide a minimum pressure drop (PD)).

an oxychlorination zone operating at between 350° and 550° C., preferably between 460° and 530° C. (for example 500° C.) in the presence of a gas containing from 1 to 4% and preferably from 1.5 to 3.5% by volume of oxygen (for example 1.9 to 3.1%) with a residence time of from 30 to 60 minutes, for example of the order of 45 minutes; and a calcination zone operating at between 350° and 550° C., preferably between 500° and 540° C., for example around 520° C., with a residence time of from 45 minutes to 80 minutes (for example of the order of 60 minutes).

The two oxychlorination and calcination zones are of the axial bed type (fixed or moving bed), with a low pressure drop.

After calcination the catalyst is generally collected by way of 4 or 8 legs and passed to a lower hopper which is swept with nitrogen, the legs permitting cooling of the catalyst and the gas (nitrogen) permitting purging of the catalyst.

A lift system then permits the catalyst to be continuously raised to a hopper before passing into a hydrogen reduction zone and then into the first reactor.

The invention concerns a method for continuously regenerating an exhausted catalyst which is also continuously drawn from a hydrocarbon conversion unit. The catalyst passes under the effect of gravity downwardly through a regeneration zone comprising a plurality of chambers; the operating conditions are different in each chamber because they each have a precise function which thus makes it possible to provide for complete regeneration of the catalyst under conditions close to those that the catalyst would have encountered in a regenerator comprising a plurality of chambers, as described in the prior art, for example in the present applicants' U.S. Pat. No. 4,133,743.

In the present invention, after being stored in the head of the regenerator, the storage phase permitting preheating thereof by means of the regeneration gases, the catalyst passes into a first annular zone, that is to say a radial burning zone (with a moving bed) in which the coke is partially eliminated; the catalyst then passes downwardly into a second annular zone, that is to say a radial burning zone (with moving bed) for complete removal of the coke, then it is collected and transferred into an axial moving bed for oxychlorination thereof by means of a slightly moist and chlorinated gas before passing into the calcination zone with an axial moving bed in which the catalyst is in contact with a hot dry gas.

Regeneration is effected by means of two separate flows of the same gas which are then brought together after they have been used, washed and recirculated by the same compressor. In addition a make-up air compressor makes it possible to have air at a sufficient pressure for that air to be introduced into the calcination gas, at a controlled flow rate.

The method according to the invention comprises:

preheating the catalyst in an inert gas atmosphere to raise it to a suitable temperature for combustion of the coke, distribution of the catalyst by means of a series of pipes which permit a good feed to the first annular zone, partial burning of the coke (50 to 90%) by means of a flow of regeneration gas which circulates through the annular bed formed by two concentric grids, complete removal of the coke by passing the catalyst into a second annular combustion zone in which the regeneration gas is the same as that used in the preceding zone, being heated by the reaction heat produced by burning of the coke, into which pressurised air is injected at a controlled flow rate, oxychlorination of the catalyst which is removed from the preceding zone by an assembly of pipes feeding a radial bed in co-flow relationship with a flow rate which is controlled in respect of % of oxygen, temperature, water content and chlorinating agent content, and calcination of the catalyst in an axial bed in counterflow relationship by a flow of dried gas, a mixture of recycled gas and compressed air, which will subsequently be used in the oxychlorination zone.

At the end of the regeneration procedure, the catalyst then passes into a hopper which is swept by inert gas, for removal of the traces of $O_2$, the hopper continuously feeding a pot for moving the catalyst upwardly again by a pneumatic transportation effect, the pot permitting precise control of the flow of catalyst through the regeneration vessel.

The two flows of regeneration gas, one of which has served for removal of the coke while the other has served for calcination thereof and then oxychlorination thereof, are mixed after the heat has been recovered, washed after neutralisation of the chlorine-bearing compounds from the regeneration operation, and recycled, by means of a compressor.

Thus the invention concerns a process for the regeneration of a catalyst for reforming or for the production of aromatic hydrocarbons in the presence of a catalyst comprising a support, at least one noble metal from the platinum family and chlorine, in at least two reactors in series through which the catalyst and the charge successively circulate, the pressure in the first reactor through which the catalyst and the charge pass being under a pressure of between 3 and 8 bars, the pressure in the last reactor being under a pressure of between 2 and 6 bars, the process being characterised in that the exhausted catalyst progressively moves downwardly in a regeneration chamber in which it successively encounters a first radial moving bed combustion zone, a second radial moving bed combustion zone, an axial moving bed chlorination or oxychlorination zone and an axial moving bed calcination zone, and that:

(a) in the first combustion zone the catalyst is treated under a pressure of from 3 to 8 bars which is substantially equal to that which obtains in said first reactor, at a temperature of between 350° and 450° C., by a combustion gas based on an inert gas circulating in co-flow relationship with the catalyst, containing from 0.01 to 1% by volume of oxygen, the combustion gas coming from a washing zone as defined hereinafter, (b) in the second combustion zone the catalyst is treated under a pressure of from 3 to 8 bars which is substantially equal to that which obtains in said first reactor, at a temperature which is at least 20° C. higher than the temperature which obtains in the first combustion zone, in the presence of the gases from the first combustion zone and in the presence of an inert make-up gas to which up to 20% by volume of oxygen is added so that the catalyst is in contact with a gas containing from 0.01 to 1% by volume of oxygen, said gases circulating in co-flow relationship with the catalyst, (c) the burning gases are discharged from the second burning zone and are passed to a washing loop after having been previously mixed with the gases drawn from the oxychlorination zone and the calcination zone, (d) in the oxychlorination zone the catalyst is treated in co-flow relationship by a mixture of a gas from the calcination zone and a gas based on a compound selected from the group formed by chlorine and chlorinated compounds, said mixture forming an oxychlorination gas containing from 4 to 10% (preferably 4.5 to 7.5%) by volume of oxygen, under a pressure of from 3 to 8 bars and at a temperature of between 350° and 550° C., and the gases are discharged from the oxychlorination zone to be mixed as indicated hereinbefore with the gases drawn from the second burning zone, in order to reach a washing loop which is common to all the gaseous effluents from the regeneration chamber, (e) in the calcination zone the catalyst is treated at between 350° and 550° C. under a pressure of between 3 and 8 bars by at least a part of the gases from the washing loop and a drying zone, with an optional make-up amount of fresh air and in such a way that the gases introduced into the calcination zone contain from 1 to 10% by volume of oxygen (preferably from 4 to 8%) and do not contain more than 100 ppm of water vapour, (f) the other part of the gases from the washing loop being used in step (a) as a combustion (burning) gas.

Preferably, it is possible to operate in the course of step (a) at between 3 and 8 bars, at a temperature of between 380° and 420° C.; in the course of step (b) it is possible to operate at a pressure of between 3 and 8 bars and at a temperature which is 60° to 80° C. higher than the temperature which obtains in step (a), that is to say in the first combustion (burning) zone, and in the course of each of steps (d) and (e) it is possible to operate at a pressure of between 3 and 8 bars.

Preferably also, in the course of step (e), the amount of oxygen by volume is between 5 and 7% with a water content of less than 50 ppm and in the course of step (c) the oxychlorination gas contains from 500 to 7,000 ppm of water and more particularly between 1,000 and 3,000 ppm.

The single sheet of drawing illustrates the invention. The exhausted catalyst is removed from the reforming reactor and by way of the conduit 6 is introduced into a flask 7 from which it is passed by way of lines 14 and 15 through the valve 13 to the storage flask 12. That transfer is effected for example with nitrogen (source 92) through the conduit 1, the valve 41, the conduit 2, the conduit 4 and the valve 5. Hydrogen reaches the buffer flask 12 by way of the conduit 8 and the flask 7 by way of the conduit 42, the valve 10 and the conduit 11. The catalyst then goes to the top 20 of the regeneration chamber by way of the conduit 17, the valve 18 and the conduit 17*a*.

The catalyst is then introduced by way of the conduits or legs 9 into a first zone 101 of annular and radial type. In that zone with a moving bed of catalyst (pressure for example 5.7 bars) the catalyst is subjected to a first burning or combustion step by means of a gas which is generally inert and which is introduced by way of the conduit 102, also containing oxygen (by way of example, 0.6%). The temperature is for example preferably from 400° to 420° C.; at the end of the first step, at the discharge from the combustion zone 101, the catalyst is at a markedly higher temperature, for example of the order of 470° C. The gases circulate in co-flow relationship with the catalyst. The catalyst then moves downwardly by way of the legs 103 into a second annular and radial zone 105 which operates at a higher temperature than the zone 101, the additional heat coming from the catalyst taken from the zone 101. In that zone, the catalyst is subjected to a second combustion step by means of the gases from the first combustion zone and by means of a make-up gas introduced by way of the conduit 104, which can have a higher oxygen content than the gas introduced by way of the conduit 102 into the zone 101 (air for example, as shown in the drawing, which is supplied from 121 and the conduit 24 by means of the pump 25). In the second combustion zone 105 the gases still flow in co-flow relationship with the catalyst and then in the lower part of the second combustion zone they are taken off by way of the conduit 108 to the exchanger 132 where they are cooled and communicate heat to the gas which is passed by way of the line 155, the furnace 157 and the conduit 102 to the first combustion zone 101. The catalyst which is taken from the second combustion zone 105 is then entrained by gravity in the legs 106 into a third zone 107 which is used to effect oxychlorination of the catalyst. In the zone 107 the catalyst is disposed in the form of an axial moving bed. The temperature is for example of the order of 500° C., the heat essentially coming from the second combustion zone 105. In the oxychlorination zone the catalyst is brought for example at a pressure of 5.4 bars into contact in co-flow relationship with the gases from the calcination zone defined hereinafter and also into contact with a gas introduced by way of the conduit 114, containing a compound selected from the group formed by chlorine and chlorinated compounds.

The mixture which is used in that way as a gas for oxychlorination of the catalyst in the chamber 107 is particularly suitable by virtue of the low and critical amounts of water vapour that it contains, which was not the case with the prior art in which the oxychlorination zone was fed with the combustion gases which, as a result of burning of the coke deposited on the catalyst, contained fairly large amounts of water. On issuing from the oxychlorination reaction the catalyst moves downwardly by way of the legs 115 into a calcination zone 116 in which the catalyst is disposed therein in the form of an axial moving bed and not a radial bed, as in the two combustion zones 101 and 105. By way of example, the temperature in the calcination zone 116 is 520° C. with a pressure of the order of 5.4 bars. The calcination operation is to be carried out in the presence of dry gases which preferably do not contain more than 50 ppm of water. Those gases come from the conduit 136 from the furnace 135; the furnace was preceded upstream thereof by a drying zone 150, the gases which are used in that way coming from a loop for washing of the gaseous effluents from the four zones of the regeneration chamber. The gases used for the calcination operation may have received a make-up amount of fresh air from the conduit 26, the valve 27 and the conduit 28. They are introduced by way of the bottom of the calcination zone and thus flow in counter-flow relationship with the grains of catalyst and follow their path of movement for example through a central chimney to the top of the oxychlorination zone 107 in order for them then to be circulated in the oxychlorination zone 107 (after a make-up amount of chlorinated compound from the conduit 114), in coflow relationship with the catalytic particles.

The calcined catalyst is discharged from the regeneration chamber by way of the legs 122 to a container 35, for example by means of nitrogen (source 36), flowing in the conduits 38 and 39 through the valve 37. The regenerated catalyst is introduced by way of the conduit 16 for example into the lift pot 43 to be transported by way of the line 19 towards the top of a reforming reactor.

As indicated above, the gaseous effluents which are drawn from the two combustion zones are drawn off by way of a conduit 108. On issuing from the exchanger 132 they are entrained by way of the conduit 134 to a washing loop which is described hereinafter and which they will reach after having been mixed with the gaseous effluents that are drawn from the oxychlorination and calcination zones, those gases having been drawn off by way of the conduit 111 from the lower part of the oxychlorination zone 107. The gaseous effluents of the conduit 111 have previously passed through the exchanger 119 to be cooled while heating in the exchanger 119 the gas introduced into the calcination zone by way of the conduits 44, 118 and 136.

At the outlet from the washing loop the gases go to the generally single compressor 152 of the washing and recycling loop, raising the pressure of the gases for example from 4 to 6.4 bars. On issuing from the compressor by way of the line 153 the gases are divided into two flows (distributor valve 31). A first flow of gas which is intended for combustion of the catalyst flows by way of the line 32, the exchanger 132 (which is intended to heat the dry gases washed by indirect contact with the gaseous effluents from the two combustion zones) and reaches by way of the line 155, the furnace 157 and the line 102 the first combustion zone (a make-up amount of air may be introduced by way of the line 104). A second flow of gas which is intended for the calcination zone and then the oxychlorination zone flows from the line 33 towards the bottom of the calcination zone 116 (a make-up amount of air may be added by way of the line 28).

By way of further example, the following operating conditions may be used:

first combustion zone:
- intake temperature of 400° C.
- inert combustion gas containing 0.5% of oxygen (by volume)

second combustion zone:
- temperature of the gases: 460°to 470° C.
- % of oxygen in the gases: 0.3 to 0.4% (by volume)

oxychlorination zone:
- temperature of the gases: 500°to 510° C.
- % of oxygen in the gases: 5 to 7% (by volume)

calcination zone:

temperature of the gases: 510°to 520° C.

% of oxygen in the gases: 5 to 7% (by volume).

An improvement in the present invention concerns the use of a particular washing loop associated with re-distribution to the combustion, chlorination or oxy-chlorination and calcination zones.

As indicated above, the gaseous effluents which are drawn off from the two combustion zones are taken off by way of a conduit 108. On leaving the exchanger 132 they are entrained by way of the conduit 134 to the air cooler 137 from which they are taken off by way of the conduit 138. It is there that the gaseous combustion effluents are mixed with the gaseous effluents taken from the oxychlorination and calcination zone, those gases having been drawn off by way of the conduit 111 from the lower part of the oxychlorination zone 107. The gaseous effluents from the conduit 111 have previously passed through the exchanger 119 to be cooled while heating in that exchanger 119 the gas introduced into the calcination zone by way of the conduits 44, 118 and 136.

Once combined in the conduit 139 the flows of gas coming on the hand from the two combustion zones and on the other hand from the calcination and oxychlorination zones are passed for example at a flow rate of 5,000 kg/h to a washing loop which generally comprises two zones. The first washing zone 146 is formed by a conventional washing apparatus, for example a column which involves the gases to be purified being bubbled through the washing solution. The washing operation there is effected for example with an aqueous solution (line 145a) of soda (line 144) or potash or an equivalent, for example mineral, compound. In addition the solution used advantageously contains at least one thiosulphate, to avoid in particular the formation of foams and to improve washing of the gaseous chlorine. In the Figure the soda then circulates through the lines 145 and 139 and is then recycled after use (and possibly purging in the conduit 148) by way of the line 141, the pump 142 and the conduit 143.

The gases which are washed in that way contain soda or potash or any equivalent compound used in the course of the washing operation, in the form of traces, in place of the halogen which was contained in those gases at their entry into the washing zone. The washing chamber or apparatus therefore includes a second washing zone which is also formed by a conventional device such as a plate-type column 147 in which the gases to be purified are washed with substantially pure water (conduit 145a).

The gases which are purified in that way are saturated with water, which does not cause problems here since those gases must at any event pass through at least one drying zone such as 150a into which the gases pass by way of the conduit 149, for example at a temperature of 30° C. and a pressure of 4.6 bars.

On issuing from the washing loop as indicated hereinbefore, the gases in the line 149 pass through the drying zone 150a. Dry gases are recovered by way of the conduit 151 and go to the generally single compressor 152 of the washing and recycling loop, raising the pressure of the gases for example from 4 to 6.4 bars. On issuing from the compressor by way of the line 153 the gases are divided into two flows (distributor valve 31). A first flow of gas which is intended for combustion of the catalyst flows by way of the line 32 and the exchanger 132 (which is intended to heat the dry gases washed by indirect contact with the gaseous effluents from the two combustion zones) and reaches by way of the line 155, the furnace 157 and the line 102, the first combustion zone (a make-up amount of air may be introduced by way of the line 104). A second flow of gas which is intended for the calcination zone and then the oxychlorination zone flows from the line 33 to the bottom of the calcination zone 116 (a make-up amount of air may be introduced by way of the line 28).

Thus the present improvement concerns a process for the regeneration of a reforming catalyst or a catalyst for the production of aromatic hydrocarbons in the presence of a catalyst including a support, at least one noble metal from the family of platinum and chlorine, the process being characterised in that in the regeneration zone the catalyst successively passes through two combustion zones with a radial moving bed; an oxychlorination zone with a radial moving bed and a calcination zone with an axial moving bed, the gases taken off from the combustion zones being mixed with the gases taken off from the oxychlorination zone, the latter themselves coming from the calcination zone, the resulting mixture being passed into a washing zone and into a drying zone, at the discharge from which the gases pass through a compression zone, and that then a part of the washed and dried gases is heated by indirect contact with the mixture of the gases taken from the combustion zones and is passed to the first combustion zone through which the catalyst passes, that another part of the washed and dried gases has make-up air (or equivalent gas) added thereto and is then heated by indirect contact with the gaseous effluents taken from the calcination zones and the oxychlorination zone and is passed to the calcination zone, that a make-up amount of air or an equivalent gas is passed into the second combustion zone and that a gas containing chlorine or a chlorinated compound is passed into the oxychlorination zone.

The present invention also concerns the apparatus corresponding on the one hand to a reforming process and on the other hand to a particular regeneration loop associated with re-distribution to the regeneration zones, namely the combustion, oxychlorination and calcination zones.

Thus the present invention also concerns an apparatus comprising in combination a chamber for regeneration of a catalyst and means on the one hand for washing the gases taken from the regeneration chamber and on the other hand for re-distribution to the regeneration zone of the gases which are recovered after washing, characterised in that the regeneration zone comprises:

two radial combustion zones 101 and 105 which are disposed in series, with circulation of the catalyst in a moving bed, a conduit 102 for the introduction of gas in the upper part of the first combustion zone 101, means 108 for discharge of gas in the lower part of the second combustion zone 105, a radial oxychlorination zone 107 with circulation of the catalyst in a moving bed, a conduit 114 for passing chlorine or a chlorinated compound to the upper part of the oxychlorination zone, a conduit 111 for taking off gas in the lower part of the oxychlorination zone 107, an axial calcination zone 116 with circulation of the catalyst in a moving bed, a conduit 136 for the introduction of a gas in the lower part of the calcination zone 116, and in the lower part of said calcination zone at least one leg 122 for taking off catalyst, and that the means for washing and re-distribution of the gases used in the regeneration chamber comprise:

a conduit 139 in which are mixed on the one hand the gases coming from the conduit 108 for discharge of the gases from the combustion zone 105 and on the other hand the gases coming by way of the conduit 111 from the oxychlorination zone 107, and at least one exchanger 132 for effecting cooling of the gases in the conduit 108, an air cooler 137 for cooling the gases from the exchanger 132, a zone 147 for washing of the mixture of gaseous effluents from the regenerator, a zone 150*a* for drying the gases taken from the washing zone 147, a compressor 152 for compressing the gases from the washing zone 147 and the drying zone 150*a*, a device 31 for separating the gases taken from the compressor 152 into two flows, said exchanger 132 for heating a part of the gases from the compressor 152, a conduit 155 for taking from the exchanger 132 the gases which are heated in that way to feed the conduit 102 for providing the feed of gas for the upper part of said first combustion zone 101 of the regeneration chamber, and conduits 33 and 44 for circulating another part of the gases coming by way of the device 31 from the compressor 152 for the purposes of supplying gas to the conduit 136 of the lower part of said calcination zone (after the gases of the conduit 44 have passed through said exchanger 119 for heating of said gases by indirect contact with the effluent gases coming by way of the conduit 111 from the oxychlorination zone 107).

The apparatus makes it possible to effect regeneration of a catalyst which is continuously taken from a hydrocarbon conversion unit. In the regenerator the catalyst circulates due to the effect of gravity and with a controlled flow rate through the regeneration zones.

The apparatus is arranged in such a way that the following operations can be carried out in succession:

preheating of the catalyst in an inert gas atmosphere to raise it to a suitable temperature for combustion of the coke, distribution of the catalyst by means of a series of pipes which permit a good feed to the first annular zone 101, partial burning of the coke (from 50 to 90%) by virtue of a flow of regeneration gas passing through the annular bed formed by two concentric grids, complete elimination of the coke by passing the catalyst into a second annular combustion zone 108 in which the regeneration gas is the same as that used in the preceding zone, being heated by the heat of reaction produced by burning of the coke, into which pressurised air is injected at a controlled flow rate, oxychlorination of the catalyst extracted from the preceding zone by an assembly of pipes feeding a radial bed in co-flow relationship with a flow which is controlled in respect of % of oxygen, temperature, water content and chlorinating agent content, and calcination of the catalyst in an axial bed in counter-flow relationship by means of a flow of dried gas, a mixture of recycled gas and compressed air, which will be subsequently used in the oxychlorination zone.

On issuing from the regeneration step, the catalyst then passes into a hopper which is swept by means of inert gas to permit the removal of the traces of $O_2$, the hopper continuously feeding a pot for upward movement of the catalyst by a pneumatic transportation effect, the pot permitting precise control of the flow of catalyst through the regeneration flask.

We claim:

1. A process for the regeneration of a catalyst, wherein said catalyst comprises a support, at least one noble metal from platinum family and chlorine, and said catalyst is used in reforming or for the production of aromatic hydrocarbons in at least two reactors in series through which the catalyst and hydrocarbon charge successively circulate, wherein the pressure in the first reactor is between 3 and 8 bars and the pressure in the last reactor is between 2 and 6 bars, the process being characterized in that the exhausted catalyst progressively moves downwardly in a regeneration chamber in which it successively encounters a first radial moving bed combustion zone, a second radial moving bed combustion zone, an axial moving bed oxychlorination zone and an axial moving bed calcination zone, and that:

(a) in the first combustion zone, the catalyst is treated under a pressure of from 3 to 8 bars which is substantially equal to the pressure in the first reactor, at a temperature of between 350° and 450° C., by a combustion gas which comprises an inert gas circulating in co-flow relationship with the catalyst, containing from 0.01 to 1% by volume of oxygen, the combustion gas coming from a washing zone as defined hereinafter, (b) in the second combustion zone, the catalyst is treated under a pressure from 3 to 8 bars which is substantially equal to the pressure in the first reactor, at a temperature which is at least 20° C. higher than the temperature in the first combustion zone, in the presence of the gases from the first combustion zone and an inert make-up gas containing up to 20% by volume of oxygen so that the catalyst is in contact with a gas containing from 0.01 to 1% by volume of oxygen, said gases circulating in co-flow relationship with the catalyst, (c) the combustion gases are discharged from the second combustion zone and are passed to a washing loop after having been mixed with the gases drawn from the oxychlorination zone and the calcination zone, (d) in the oxychlorination zone, the catalyst is treated in co-flow relationship by a mixture of gas from the calcination zone and a gas comprising a compound selected from the group consisting of chlorine and chlorinated compounds, said mixture forming an oxychlorination gas containing 4 to 10% by volume of oxygen, under a pressure of from 3 to 8 bars and at a temperature between 350° and 550° C., and wherein the gases are discharged from the oxychlorination zone to be mixed with the gases drawn from the second combustion zone in order to reach a washing loop which is common to all the gaseous effluent from the regeneration chamber, (e) in the calcination zone, the catalyst is treated in counter-flow relationship at between 350° and 550° C. under a pressure of between 3 and 8 bars by at least a part of the gases from the washing loop, which are dried in a drying zone, and, optionally, a make-up amount of fresh air wherein the gases introduced into the calcination zone contain from 1 to 10% by volume of oxygen and no more than 100 ppm of water vapor, (f) wherein the other part of the gases from the washing loop are used in step (a) as a combustion gas.

2. A process according to claim 1 wherein, in the course of step (a), operation is at a temperature of between 380° and 420° C., in the course of step (b) operation is at a pressure of between 3 and 8 bars and at a temperature which is 60° to 80° C. higher than the temperature which obtains in step (a), in the first combustion zone, and in the course of each of steps (d) and (e) operation is at a pressure of between 3 and 8 bars.

3. A process according to claim 1 wherein, in the course of step (e) the amount of oxygen by volume is between 5 and 7% with a water content of less than 50 ppm.

4. A process according to claim 1 wherein, in the course of step (c) the oxychlorination gas contains from 500 to 7,000 ppm of water.

5. A process according to claim 4, wherein the water vapour content of the oxychlorination gas is between 1,000 and 3,000 ppm.

6. A process according to claim 1 wherein in two combustion zones with a radial moving bed; an oxychlorination zone with an axial moving bed and a calcination zone with an axial moving bed, the gases taken off from the combustion zones being mixed with the gases taken off from the oxychlorination zone, the latter themselves coming from the calcination zone, the resulting mixture being passed into a washing zone and then into a drying zone, at the discharge from which the gases pass through a compression zone, and that then a part of the washed and dried gases is heated by indirect contact with the mixture of the gases taken from the combustion zones and is passed to the first combustion zone through which the catalyst passes, that another part of the washed and dried gases has make-up air added thereto and is then heated by indirect contact with the gaseous effluents taken from the calcination zones and the oxychlorination zone and is passed to the calcination zone, that a make-up amount of air or an equivalent gas is passed into the second combustion zone and that a gas containing chlorine or a chlorinated compound is passed into the oxychlorination zone.

7. A process for the regeneration of a catalyst, wherein said catalyst comprises a support, at least one noble metal from the platinum family and chlorine, and said catalyst is used in reforming or for the production of aromatic hydrocarbons in at least two reactors in series through which the catalyst and hydrocarbon charge successively circulate, wherein the pressure in the first reactor is between 3 and 8 bars and the pressure in the last reactor is between 2 and 6 bars, the process being characterized in that the exhausted catalyst progressively moves downwardly in a regeneration chamber in which it successively encounters a first radial moving bed combustion zone, a second radial moving bed combustion zone, a radial moving bed oxychlorination zone and an axial moving bed calcination zone, and that:

(a) in the first combustion zone, the catalyst is treated under a pressure of from 3 to 8 bars which is substantially equal to the pressure in the first reactor, at a temperature of between 350° and 450° C., by a combustion gas which comprises an inert gas circulating in co-flow relationship with the catalyst, containing from 0.01 to 1% by volume of oxygen, the combustion gas coming from a washing zone as defined hereinafter, (b) in the second combustion zone, the catalyst is treated under a pressure from 3 to 8 bars which is substantially equal to the pressure in the first reactor, at a temperature which is at least 20° C. higher than the temperature in the first combustion zone, in the presence of the gases from the first combustion zone and an inert make-up gas containing up to 20% by volume of oxygen so that the catalyst is in contact with a gas containing from 0.01 to 1% by volume of oxygen, said gases circulating in co-flow relationship with the catalyst, (c) the combustion gases are discharged from the second combustion zone and are passed to a washing loop after having been mixed with the gases drawn from the oxychlorination zone and the calcination zone, (d) in the oxychlorination zone, the catalyst is treated in co-flow relationship by a mixture of gas from the calcination zone and a gas comprising a compound selected from the group consisting of chlorine and chlorinated compounds, said mixture forming an oxychlorination gas containing 4 to 10% by volume of oxygen, under a pressure of from 3 to 8 bars and at a temperature between 350° and 550° C., and wherein the gases are discharged from the oxychlorination zone to be mixed with the gases drawn from the second combustion zone in order to reach a washing loop which is common to all the gaseous effluent from the regeneration chamber, (e) in the calcination zone, the catalyst is treated in counter-flow relationship at between 350° and 550° C. under a pressure of between 3 and 8 bars by at least a part of the gases from the washing loop, which are dried in a drying zone, and, optionally, a make-up amount of fresh air wherein the gases introduced into the calcination zone contain from 1 to 10% by volume of oxygen and no more than 100 ppm of water vapor, (f) wherein the other part of the gases from the washing loop are used in step (a) as a combustion gas;

wherein the gases taken off from the combustion zones are mixed with the gases taken off from the oxychlorination zone, the resulting mixture being passed into a washing zone and then into a drying zone, at the discharge from which the gases pass through a compression zone, and that then a part of the washed and dried gases is heated by indirect contact with the mixture of the gases taken from the combustion zones and is passed to the first combustion zone through which the catalyst passes, that another part of the washed and dried gases has make-up air added thereto, is then heated by indirect contact with the gaseous effluent taken from the calcination zones and the oxychlorination zone and is passed to the calcination zone, that a make-up amount of air or an equivalent gas is passed into the second combustion zone and that a gas containing chlorine or a chlorinated compound is passed into the oxychlorination zone.

* * * * *